Aug. 21, 1951 M. J. SCHLITTERS 2,564,728
BORING AND TREPANNING TOOL HOLDER
Filed May 17, 1948
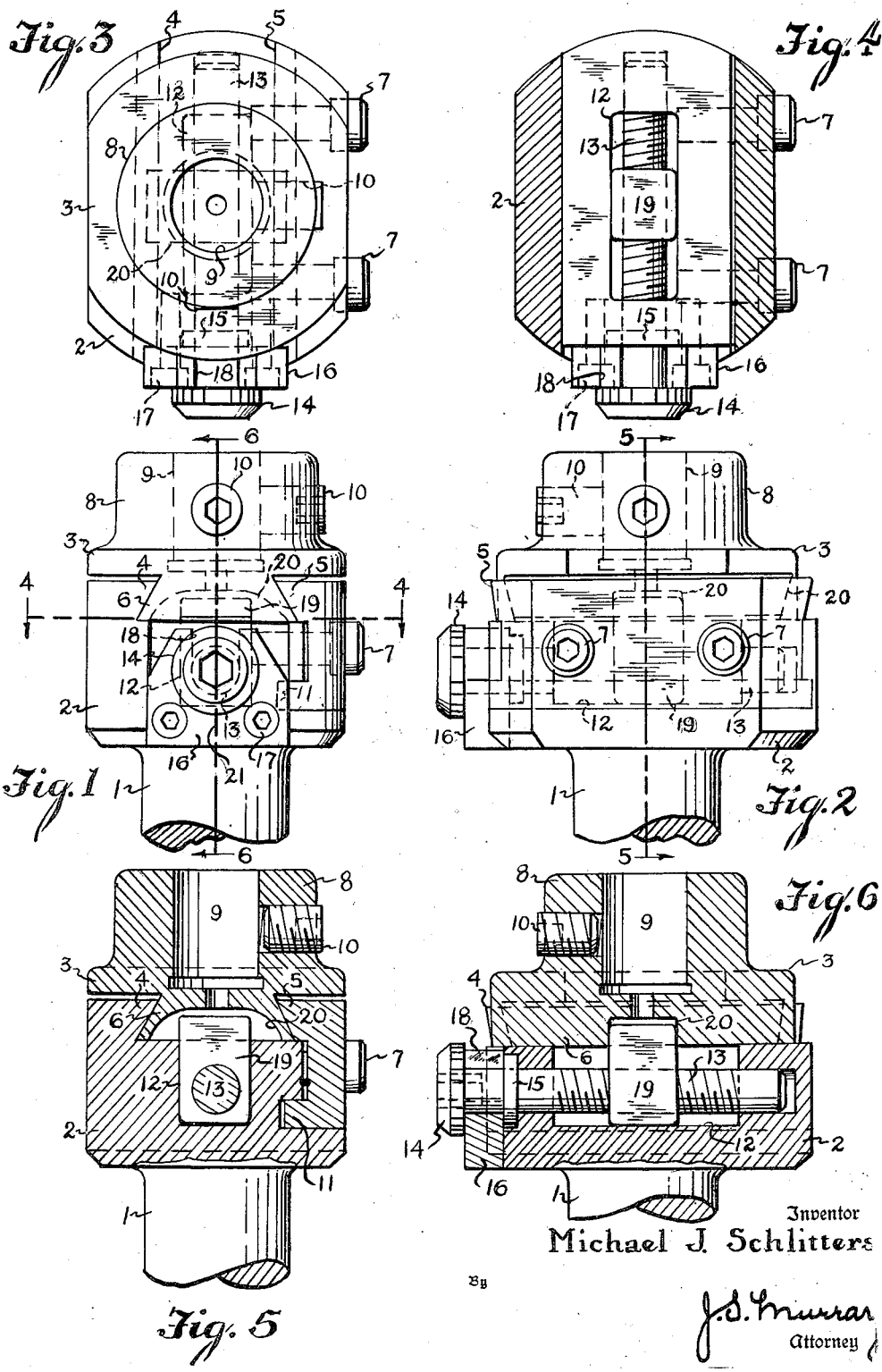
Inventor
Michael J. Schlitters
By
Attorney Patented Aug. 21, 1951

2,564,728

UNITED STATES PATENT OFFICE 2,564,728

BORING AND TREPANNING TOOLHOLDER

Michael J. Schlitters, Detroit, Mich.

Application May 17, 1948, Serial No. 27,592

2 Claims. (Cl. 279—6)

This invention relates to boring tool holders and particularly tool holders suited for automatic screw machine and turret lathe use in performing boring and other operations. More specifically, the invention relates to a tool holder of a type in which a boring bar carrier is slidable across the axis of a head fixed on a tool shank, an adjusting screw being installed on said head to position such carrier selectively on the head, and provision being made to clamp the carrier in any position established by the screw.

An object of the invention is to adapt a boring tool carrier to undergo sliding adjustment between two guide rails, one of which is adapted to apply clamping pressure to the carrier for holding it selectively adjusted.

Another object is to render said clamping rail detachable to facilitate assembly and disassembly of the tool holder.

Another object is to provide an improved mounting for a screw employed to slidingly adjust the boring bar carrier.

Another object is to provide an improved actuating connection from the screw to said carrier.

These and various other objects are attained by the construction hereinafter described and illustrated in the accompanying drawing, wherein:

Fig. 1 is a front elevational view of the improved tool holder.

Fig. 2 is a side elevational view of the same.

Fig. 3 is a view of the tool-receiving end of the holder.

Fig. 4 is a cross sectional view of the holder taken on the line 4—4 of Fig. 1.

Fig. 5 is an axial cross section taken on the line 5—5 of Fig. 2.

Fig. 6 is an axial cross section on the line 6—6 of Fig. 1.

In these views, the reference character 1 designates a cylindrical shank integrally and terminally formed with an enlarged head 2. Slidable in said head across its central axis is a tool carrier 3, guided in such travel by rails 4 and 5 on the head 2. The carrier has a dovetailed rib 6 fitting between said rails which are undercut conformingly to such rib. The rail 5 is detachable, being secured to the head by headed screws 7. When these are tightened, the rib is clamped firmly between the two rails to positively maintain any desired position of sliding adjustment of the carrier 3. The latter is formed with a central boss 8 on its face remote from the head 2, such boss having a socket 9 to receive a boring bar (not shown), and set screw 10 in the boss serving to clamp said bar in the socket. The rail 5 has a tongue 11 extending from end to end of such rail and fitting into a groove of the head 2 to assist in accurately maintaining the intended position of such rail.

A substantially rectangular chamber 12 opens into the head 2 from its end face between the rails 4 and 5, such chamber being elongated in parallelism with the rails. Extending through said chamber from end to end thereof and journaled in its end walls, is an adjusting screw 13, projecting at one end exteriorly of the head and formed on such end with a knob 14 having a serrated rim. To resist endwise travel of said screw, it is engaged between the knob 14 and a collar 15 on the screw by a plate 16 set into the front face of the head 2 and rigidly mounted on the latter by screws 17. Said plate has a U-shaped pocket 18 accommodating an unthreaded portion of the screw between the knob and collar thereof, said collar serving as a journal for the front end of the screw. Slidably fitted in the chamber 12 is a rectangular feed nut 19 engaged and actuable lengthwise of said chamber by the screw 13. An end portion of said nut engages the carrier 3, fitting the width of a groove 20 machined in the inner face of the carrier and elongated transversely to the chamber 12. An index line 21 on the plate 16 coacts with the serrations on the knob 14 to accurately indicate small increments of rotational travel of the screw 13.

In use of the described tool holder, the carrier 3 is normally clamped firmly to the head 2 by the screws 7. When it is desired to vary the cutting radius, said screws are loosened slightly so that the carrier may slide freely. The screw 13 is then rotated to shift the carrier by means of the nut 19 to a desired position. The screws 7 are then again tightened to maintain such position.

The construction affords the carrier a desirably large range of sliding adjustment and provides in a thoroughly positive manner for maintaining any adjustment. Furthermore, the construction is relatively simple and inexpensive and ready access may be had to all its parts in case of any replacements or repairs. Said tool holder is well suited to trepanning operations as well as for boring.

What I claim is:

1. A tool holder comprising a shank having a head, an adjusting screw rotatable in said head and disposed transversely to the extended axis of said shank, a tool carrier slidable across said head and formed with a guide rib elongated in substantial parallelism with and projecting toward said screw, a pair of guide rails for said carrier extending on the head at opposite sides of said rib and overlapping the rib to retain the tool carrier on the head, one of said rails being detachable, a common means for securing the detachable rail to the head and for clamping said guide rib between the rails to hold the tool carrier selectively adjusted, means resisting axial movement of the adjusting screw, said head having a chamber extending into its end face between said rails and the adjusting screw being extended through such chamber, and a feed nut engaging the screw and non-rotatively fitted in said chamber and projecting into the tool carrier to effect sliding of such carrier, the tool carrier being grooved transversely to the length of the screw for operatively receiving the projecting portion of the nut.

2. A tool holder comprising a shank having a head, an adjusting screw rotatable in said head and disposed transversely to the extended axis of said shank, a tool carrier slidable across said head and formed with a guide rib elongated in substantial parallelism with and projecting toward said screw, a pair of guide rails for said carrier extending on the head at opposite sides of said rib and overlapping the rib to retain the tool carrier on the head, means associated with one of said rails for clamping said guide rib against the other rail to hold the tool carrier selectively adjusted, means resisting axial movement of the adjusting screw, said head having a chamber extending into its end face between said rails and the adjusting screw being extended through such chamber, and a feed nut engaging the screw within said chamber and freely inserted in the tool carrier to effect sliding of such carrier, while affording detachment of such carrier from the nut.

MICHAEL J. SCHLITTERS.

REFERENCES CITED

The following references are of record in the file of this patent:

UNITED STATES PATENTS

| Number | Name | Date |
| --- | --- | --- |
| 892,894 | Roman | July 7, 1908 |
| 1,133,169 | Morris | Mar. 23, 1915 |
| 1,153,673 | Bryant | Sept. 14, 1915 |
| 1,960,124 | Russell | May 22, 1934 |
| 2,403,336 | Brown | July 2, 1946 |